United States Patent [19]

Seghezzi et al.

[11] 4,402,637
[45] Sep. 6, 1983

[54] SELF-DRILLING DOWEL

[75] Inventors: Hans-Dieter Seghezzi, Vaduz, Liechtenstein; Paul Deutschenbaur, Unterpfaffenhofen, Fed. Rep. of Germany

[73] Assignee: Hilti Aktiengesellschaft, Schaan, Liechtenstein

[21] Appl. No.: 205,291

[22] Filed: Nov. 10, 1980

[30] Foreign Application Priority Data

Nov. 12, 1979 [DE] Fed. Rep. of Germany ....... 2945663

[51] Int. Cl.³ ............................................ F16B 13/06
[52] U.S. Cl. ...................................... 411/31; 411/44; 411/39
[58] Field of Search ................... 411/29, 30, 31, 39, 411/40, 41, 42, 44, 47, 57, 59, 64, 67; 175/385, 415

[56] References Cited

U.S. PATENT DOCUMENTS

| | | | |
|---|---|---|---|
| 1,352,494 | 9/1920 | Zifferer | 411/42 |
| 1,379,210 | 5/1921 | Phillips | 411/31 |
| 2,561,433 | 7/1951 | Uhle | 411/57 |
| 3,605,548 | 9/1971 | Mortensen | 411/44 |
| 3,851,560 | 12/1974 | Yago | 411/30 |
| 4,091,882 | 5/1978 | Hashimoto | 411/30 X |
| 4,157,677 | 6/1979 | Deutschenbaur et al. | 411/548 |
| 4,223,587 | 9/1980 | Deutschenbaur | 411/31 |

FOREIGN PATENT DOCUMENTS

| 1221056 | 7/1966 | Fed. Rep. of Germany | 411/29 |
|---|---|---|---|
| 83606 | 8/1964 | France | 411/31 |

*Primary Examiner*—Thomas J. Holko
*Attorney, Agent, or Firm*—Toren, McGeady and Stanger

[57] ABSTRACT

A self-drilling dowel is formed by a tubular member defining an axially extending bore. The tubular member has a leading end and a trailing end with a cutting head at the leading end. A spreader member is insertable into the bore for expanding the tubular member. A member, preferably a plate, is positioned within and extends transversely across the bore adjacent the leading end forming a closure. The bore closure member is spaced axially from the leading end and it is separate from the tubular member and is displaceably fitted within the bore.

13 Claims, 4 Drawing Figures

SELF-DRILLING DOWEL

SUMMARY OF THE INVENTION

The present invention is directed to a self-drilling dowel with a cutter head and a central bore extending through the dowel for receiving a spreading member. A portion of the bore in the dowel converges in the direction toward the cutter head and the bore is closed adjacent the cutter head.

As a rule, self-drilling dowels are placed in structural materials such as concrete, rock, stone or the like. Self-drilling dowels are known which, after being drilled in, do not have to be removed from the borehole in performing the spreading operation. Compared to conventional self-drilling dowels which must be removed from the borehole at the end of the drilling operation so that the borehole and the central bore of the dowel can be cleaned and subsequently reinserted and spread, the dowels which do not have to be removed afford a comparatively simple and economical placement procedure.

These easily placed self-drilling dowels which do not have to be removed for cleaning, are characterized by an axially extending bore which converges toward the cutting head with the bore being closed in the region adjacent the cutting head by a bottom member forming a part of the dowel body. Accordingly, the bottom member is formed integrally with the dowel body. The bottom member prevents the drillings produced by the cutting head as it forms the borehole from reaching the axially extending bore through the dowel body. In this manner it is ensured, after the drilling operation has been completed, that the axial bore with the spreading member within it can carry out the expanding or anchoring function and the connecting function to the dowel without any problems.

The self-drilling dowel is anchored in the borehole by means of the spreading member by displacing the spreading member axially through the bore in the dowel body. In doing so, the dowel body fractures in the region of the bottom member and presses the dowel body against the borehole surface. To ensure that the dowel body separates into tongue-like extensions of equal size during the expanding procedure, longitudinal grooves are formed in the portion of the dowel body in which the expanding action takes place. These grooves which form break lines along a portion of the length of the dowel body extending from its leading end, are formed in its outer periphery.

A relative great force is required in expanding the dowel body, in part because of the necessity to break the integral bottom member. At any rate, aside from finishing tolerances, manufacturing accuracy with respect to shape, and other factors which, to a significant extent, influence the expanding behavior of the self-drilling dowel, it has been found with these known dowels that varying expanding or anchoring values are achieved.

Therefore, the primary object of the present invention is to provide a self-drilling dowel having a defined expansion characteristic which is economical and can be placed in a simple and easy manner.

In accordance with the present invention, a separate insert member is positioned within the dowel body for closing its axially extending bore. By closing the axially extending bore with a separate insert member, a closure member is provided as in known self-drilling dowels which keeps the drillings away from the expansion section of the bore during the drilling operation and, at the same time, ensures an easier expansion of the dowel because the closure member does not have to be broken away from the remainder of the dowel body as the spreading or expanding member is driven through the dowel bore. As a result, the expanding behavior of the self-drilling dowel is achieved in a defined manner because only the dowel body must be divided or separated into individual tongue-like sections along longitudinal score lines which form the predetermined break lines along which the dowel body separates. To remove the drillings or drilled material during operation, longitudinally or helically extending grooves are formed in the outer surface of the self-drilling dowel so that the drilling can be conveyed in these grooves closed by the wall of the borehole to the surface of the structural material in which the borehole is formed.

The self-drilling dowel can produced easily because its axially extending bore is formed as a through-bore. The insert or closure member is fixed within the bore by an adhesive material or a force-fit. The closure member is located in the third portion of the axial length of the dowel extending from the cutter head, particularly in the region of the bore adjacent the cutter head. Advantageously, a plug-like insert or closure member is suitable.

In one embodiment of the present invention, the closure member is in the form of a thin plate, preferably a circular disk. Aside from the fact that such a plate can be easily produced, a significant advantage of the plate resides in its small thickness, so that such plates are especially suitable for dowels of short axial length.

To ensure a form-locking or positive engagement of the closure member within the bore, it is preferable if the member is fitted radially into the surface of the bore. A form-locking seat is especially advantageous for plate-shaped closure members. The form-locking support can also be provided by support projections which extend from the surface of the bore.

During drilling with the self-drilling dowel, the drilled material removed by the cutter head is, for the most part, removed from the borehole through the grooves in the outside surface of the dowel. During the drilling operation, however, a certain amount of the drilling collects in the opening in the bore between the cutter head and the closure member and this drilled material may become compacted and form a plug toward the end of the drilling operation. This plug grows during the drilling procedure and eventually presses against the closure member in the bore. By providing an adequate support of the closure member, it can be ensured that the formation of the plug does not move the dowel body axially opposite to the drilling direction. Preferably, the surface forming the axially extending bore in the dowel has an annular groove into which the closure or insert member seats. The groove forms a pair of shoulders extending transversely of the axial direction for supporting the outer edge surfaces of the closure member. The shoulder closer to the cutter head is smaller than the other shoulder.

To avoid the possibility that the plug within the bore ahead of the insert member may become jammed, the portion of the bore extending between the closure member and the cutter head is essentially cylindrical.

Advantageously, the closure member is located in the bore at a distance from the end of the dowel member formed by the cutter head amounting to 0.4 to 1.5 times the diameter of the dowel and preferably 0.6 times. This open space formed in the bore between the cutter head and the closure member makes it possible to accommodate a relatively large plug formed from the drilled material and, accordingly, this plug hardly reaches a volume sufficient to press against the closure member. This arrangement of the closure member has a particular advantage, when the self-drilling dowel encounters reinforcing steel, that the steel plug cut out by the dowel remains as a whole in the forward section of the bore between the cutter head and the closure member so that the drilling operation can be completed without any interference.

In a self-drilling dowel with a cutter head and an axially extending bore having a section converging toward the cutter head in which the spreader member is received, in accordance with another embodiment of the invention, a centering tip is provided within the front end of the bore projecting beyond the cutter head. When the drilling operation is commenced with the self-drilling dowel in contact with the surface of a structural material, the centering tip prevents the dowel from moving laterally and guides the dowel in a straight line during the drilling operation.

Advantageously, the centering tip is provided with a pyramidal or conical shape and is positioned on a support plate with the centering tip having a smaller base area than the surface of the support plate. While a pyramidally shaped centering tip can be easily drilled into a structural material, the conically shaped tip is especially useful because of its good centering ability. The support plate is located in the end of the bore adjacent the cutter head and can act as a closure member for preventing drilling from penetrating into the bore. When the support plate is properly tightly fitted into the bore, a separate closure member is not required.

It has been found advantageous if the support plate has a slightly greater diameter relative to the central bore for providing a force fit in the bore. Further, it is helpful if the support plate is provided with radial projections for engagement within recesses or grooves in the surface of the bore adjacent the cutter head. As a result, the support plate acts as a closure across the bore and prevents drilled material from entering that portion of the bore on the opposite side of the support plate from the cutter head. In addition, with the radial projections engaged in recesses in the bore adjacent the cutter head, the support plate ensures that the centering tip cannot rotate relative to the dowel body during the drilling operation and, further, the centering tip is supported so that it does not move rearwardly into the bore under percussion load.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
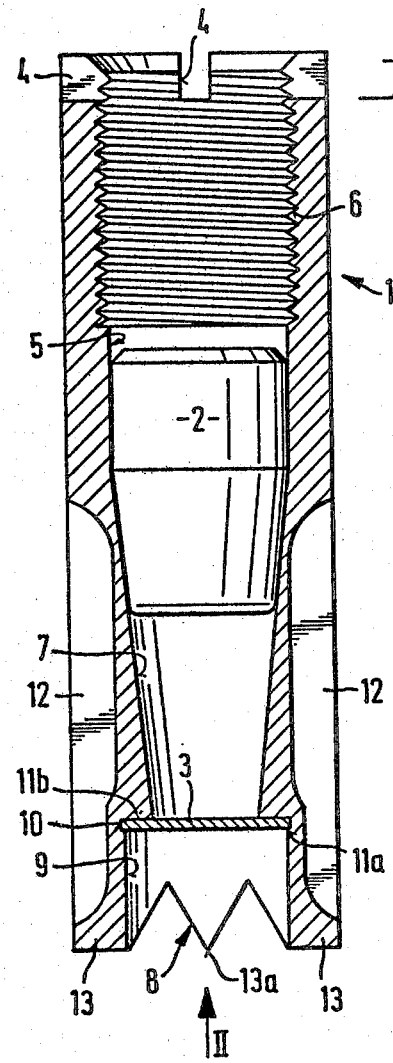
FIG. 1 is an axially extending sectional view of a self-drilling dowel with a plate-shaped insert member, in accordance with the present invention, taken along the line I—I in FIG. 2.
Figure 3:
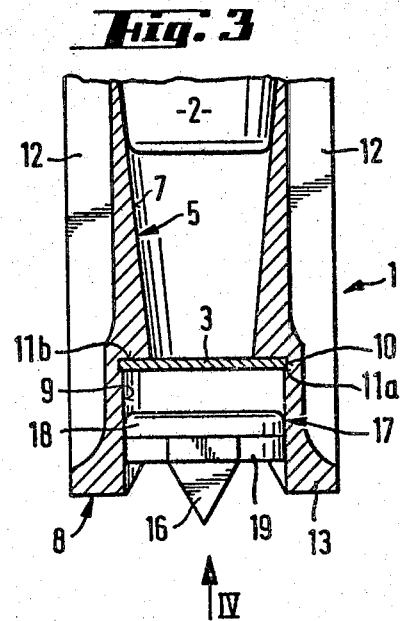
FIG. 3 is a partially axially extending sectional view of the leading end section of the self-drilling dowel displayed in FIG. 1 with a plate-shaped insert or closure member and a centering tip, taken along the line III—III in FIG. 4.

In FIG. 1 a self-drilling dowel is illustrated which drills its own borehole into a structural material, not shown, and the percussive and rotary motions are imparted to the dowel by a device, not shown. The self-drilling dowel comprises a dowel body 1 having a leading end and a trailing end, as viewed in FIG. 1 the leading end is the lower end and the trailing end is the upper end. Grooves 4 are formed in the trailing end of the dowel body 1 for engagement by a device for transmitting rotary motion to the dowel. The dowel body 1 is a tubular member having an axially extending bore 5 extending between the trailing and leading ends. The rearward section of the bore 5 extending from the trailing end contains a thread 6 for the connection of objects to be fastened to the self-drilling dowel after it is secured in position. Ahead of the thread 6 within the bore 5, the surface of the bore converged inwardly in the axial direction toward the cutting head forming a frusto-conical section 7 in which a spreading member 2 can be inserted so that it has a force fit. As can be seen in FIG. 1 the forward portion of the spreading member 2 has a frusto-conical surface complementary of the frusto-conical section 7 of the bore. The leading end of the dowel body 1 forms a cutter head 8 and a cylindrical section 9 is provided within the bore extending from the cutter head toward the trailing end for a short distance. The trailing end of the cylindrical section 9 has a greater diameter than the leading end of the frusto-conical section 7 to which it extends. At the transition from the cylindrical section 9 to the frusto-conical section 7, a plate-shaped closure or insert member 3 is positioned in an annular groove encircling the trailing end of the cylindrical section 9 of the bore 5. The annular groove 10 has spaced surfaces extending transversely of the axis of the bore forming an annular shoulder 11a closer to the cutter head 8 than an annular shoulder 11b which is formed by the difference in diameter between the frusto-conical section 7 and the cylindrical section 9. As can be seen in FIG. 3, annular shoulder 11a affords a smaller contact surface for the closure member 3 than the other annular shoulder 11b. After the completion of the drilling operation, to ensure the driving-in action of the spreading member 2 through the frusto-conical section 7, defined breaking lines are provided in the dowel body 1 extending rearwardly from adjacent a forward end to approximately the mid-plane of the dowel body. In this region of the dowel body 1 four longitudinal score lines 12 are provided uniformly distributed around the circumference. As the spreading member 2 is driven forwardly through the frusto-conical section toward the leading end of the dowel body, the dowel body breaks or separates into tongue-like parts along the score lines 12. When the spreading member 2 anchors the dowel body within the borehole, the closure member 3 is usually released from the annular groove 10. Accordingly, the spreading member can continue its forward path without any interference from the insert member 3 until the spreading position is reached for achieving a maximum anchoring value for the dowel.

Figure 2:
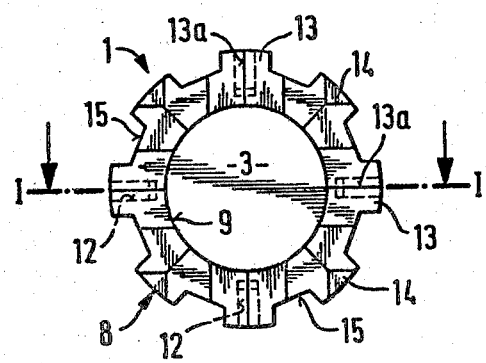
FIG. 2 is an end view of the self-drilling dowel illustrated in FIG. 1 as viewed in the direction of the arrow II.
Figure 4:
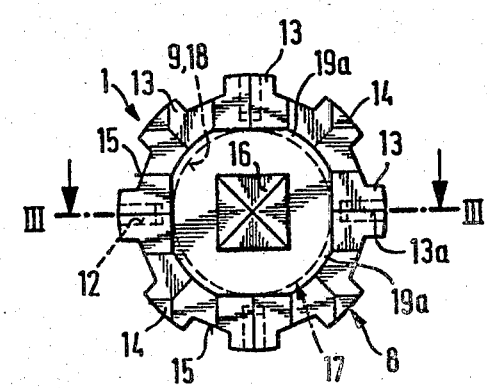
FIG. 4 is an end view of the self-drilling dowel shown in FIG. 3 as viewed in the direction of the arrow IV.

As can be seen more clearly in FIG. 2, the cutter head 8 consists of a number of angularly spaced cutting teeth 13 each with a linear cutting edge 13a and with stub teeth 14 positioned between the cutting teeth. As shown in FIGS. 2 and 4, the outside surface of the dowel body 1 has grooves 15 of trapezoidal cross-section distributed uniformly around the circumference and extending over the full length of the dowel body. The grooves 15 remove the drilled material generated as the borehole is drilled in the structural material.

The self-drilling dowel illustrated in FIG. 3 is similar to the one shown in FIG. 1, accordingly, similar parts of the dowel are provided with the same reference numerals. The self-drilling dowel in FIG. 3, however, is also provided with a pyramidally shaped centering tip 16 which projects outwardly beyond the leading end plane of the cutter head 8. Centering tip 16 is positioned on a support plate 17 and the base area of the support plate is greater than that of the centering tip. Support plate 17 consists of a circular clamping plate 18 on the closure plate side of the centering tip and this clamping plate is fixed by a force fit within the cylindrical section 9 of the bore 5. Between the clamping plate 18 and the cutter head 8 is a locking disk 19. The peripheral edge of the locking disk 19 is square, however, the corners are rounded off as displayed in FIG. 4. The rounded edges form projections 19a which extend outwardly beyond the circular peripheral contour of the clamping plate 18. Projections 19a on the locking disk 19 engage in recesses formed in the surface of the bore and located between adjacent cutting teeth 13. The projections 19a lock the support plate 17 and with it the centering tip 16 against rotation relative to the dowel body.

While specific embodiments of the invention have been shown and described in detail to illustrate the application of the inventive principles, it will be understood that the invention may be embodied otherwise without departing from such principles.

What is claimed is:

1. Self-drilling dowel comprising an axially extending tubular member having a leading end and a trailing end with a bore extending therethrough between the leading end and the trailing end, said tubular member having a cutting head on the leading end thereof, said bore having an axially extending portion with the surface thereof being in converging relation in the direction toward the leading end, a spreader member insertable within said bore and engageable with the converging surface thereof for effecting the radial expansion of said tubular member, and means for forming a closure extending transversely across said bore adjacent the leading end thereof so that an axially extending part of said bore extends between the leading end and the closure formed by said means, wherein the improvement comprises that said means comprise a closure member separate from said tubular member and said closure member being displaceably secured into the surface of said bore at a location spaced axially from the leading end of said tubular member and said closure member being axially displaceable from the location at which it is secured within said bore toward the leading end by said spreader member during the radial expansion of said tubular member.

2. Self-drilling dowel, as set forth in claim 1, wherein said closure member being formed as a plug.

3. Self-drilling dowel, as set forth in claim 1, wherein said closure member being in the form of a thin plate.

4. Self-drilling dowel, as set forth in claim 1, wherein said closure member being in the form of a circular disk.

5. Self-drilling dowel, as set forth in claim 1, 2, 3 or 4, wherein said closure member being fixed within the surface of said bore.

6. Self-drilling dowel, as set forth in claim 5, wherein the surface of said bore has an annular groove therein encircling the axis of said bore and said closure member being fitted within said groove, said groove having a first surface and a second surface each extending transversely of the axial direction of said bore with said first surface being closer to said cutting head than said second surface and said first surface having a smaller contact surface with said closure member than said second surface.

7. Self-drilling dowel, as set forth in claim 6, wherein said bore being cylindrically shaped in the axial direction extending between said closure member and said cutting head.

8. Self-drilling dowel, as set forth in claim 1, wherein said closure member extending transversely of the axial direction of said bore and being spaced from the transverse plane of the leading end of said tubular member by a dimension in the range of 0.4 to 1.5 times the diameter of the said tubular member.

9. Self-drilling dowel, as set forth in claim 8, wherein said closure member being spaced from the transverse plane of the leading end of said tubular member by a dimension equal to 0.6 times the diameter of said tubular member.

10. Self-drilling dowel, as set forth in claim 1, wherein a centering tip being supported within said bore adjacent the leading end thereof with said centering tip projecting outwardly from the bore beyond the transverse plane of the leading end of said tubular member.

11. Self-drilling dowel, as set forth in claim 10, wherein said centering tip being pyramidally shaped in transverse section, a support plate located within said bore adjacent the leading end of said tubular member with said centering tip being supported on and extending outwardly from said support plate, and said centering tip having a smaller base area than the area of said support plate extending transversely of said bore.

12. Self-drilling dowel, as set forth in claim 10, wherein a support plate located within said bore adjacent the leading end of said tubular member with said centering tip supported on and extending outwardly from said support plate, said support plate having a slightly larger diameter than the diameter of said bore in said tubular member for affording a force fit of said support plate with said bore, and said support plate having radially outwardly extending projections thereon, and the surface of said bore having recesses therein into which said projections seat for securing said support plate against rotation relative to the surface of said bore.

13. Self-drilling dowel, as set forth in claim 12, wherein said projections being located on said support plate on the peripheral edge surface thereof closest to said leading end of said tubular member.

* * * * *